(No Model.)
H. C. LINDNER & B. D. HARRIS.
TAIL SCREW.
No. 420,349. Patented Jan. 28, 1890.
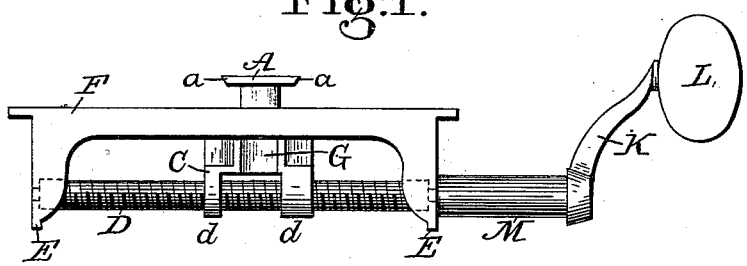
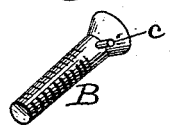
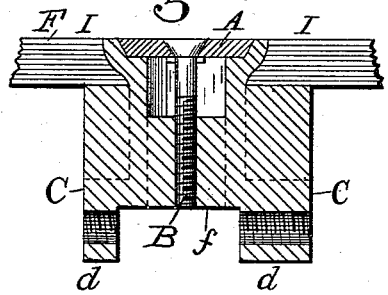
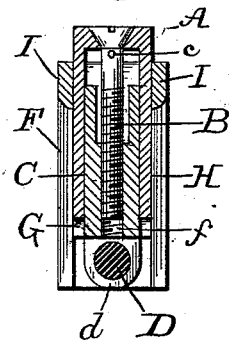
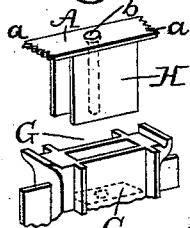
WITNESSES:
F. M. Burnham
Chas. J. Stockman
INVENTORS
Benj. D. Harris
and
H. C. Lindner
BY Chas. E. Barber
ATTORNEY.

United States Patent Office.

HENRY C. LINDNER AND BENJAMIN D. HARRIS, OF DAYTON, OHIO; SAID HARRIS ASSIGNOR TO SAID LINDNER.

TAIL-SCREW.

SPECIFICATION forming part of Letters Patent No. 420,349, dated January 28, 1890.

Application filed November 26, 1889. Serial No. 331,691. (No model.)

*To all whom it may concern:*

Be it known that we, HENRY C. LINDNER and BENJAMIN D. HARRIS, citizens of the United States, residing at Dayton, in the county of Montgomery and State of Ohio, have invented a certain new and useful Tail-Screw, of which the following is so full, clear, and exact a description as will enable others skilled in the art to which our invention appertains to make and use the same.

Our invention relates to tail-screws; and it consists of the peculiar construction and combination of parts hereinafter fully described, and specifically pointed out in the claims.

The object of our invention is to provide a light cheap serviceable tail-screw for the use of cabinet-makers, carpenters, &c. We attain these objects by the mechanism illustrated in the accompanying drawings, in which—

Figure 1 is a side elevation of our improved tail-screw. Fig. 2 is a longitudinal vertical section of the same, showing side pieces I I broken away. Fig. 3 is a detail transverse section. Fig. 4 is a detail perspective showing parts separated. Fig. 5 is a detail of the screw.

In the accompanying drawings, A designates a dog provided with teeth $a$ $a$ and a central perforation $b$, through which extends a screw B, which screw B is provided with a stop $c$, which extends across and below the opening $b$, and a head, which prevents the screw B from working up and down in the hole $b$, thus confining the dog. A carriage C is provided with two perforated projections $d$ $d$, through which extends a longitudinal working rod D, which is screw-threaded between the points E E on the main frame F. This carriage is provided with rectangular recesses G G, within and upon which slide vertically the downward flanges H H on the dog A. The central portion of the carriage C is screw-threaded at $f$. The main frame F is provided with two pieces I I, which prevent the dog and carriage from tipping over and falling to one side of the line of the main screw-rod D. This main screw-rod is provided with a handle K and knob L, and is slightly enlarged at M to prevent the screw-rod D from moving laterally through the projections E E, in which it is permanently journaled.

The operation of our tail-screw is as follows: The dog A is vertically adjusted in the carriage C by means of the screw B working in the hole $f$ in the carriage, and the carriage C is operated longitudinally by means of the screw D to clamp any article to be operated on, it being understood that the work-bench is provided with a second dog, as A, at a suitable point on the work-bench, and the article to be operated on is clamped between the two dogs in the usual manner.

Having now described our invention, what we believe to be new and desire to secure by Letters Patent, and what we therefore claim, is—

1. A tail-screw consisting of a dog movable longitudinally by means of a screw, in combination with a screw connected with said dog, and a carriage against which the screw operates to raise and lower the dog, said screw provided with a stop and a head, between which stop and head is confined a movable dog, substantially as and for the purpose specified.

2. In a tail-screw of the character described, the combination of the main frame and a longitudinal screw D, having a handle and knob, with a carriage provided with recesses, and a screw-threaded hole $f$, and a dog provided with flanges H H, and a screw having a stop and head between which said dog is confined, all constructed and combined to operate substantially as and for the purpose specified.

In testimony whereof we affix our signatures in the presence of two witnesses.

HENRY C. LINDNER.
BENJAMIN D. HARRIS.

Witnesses:
R. M. ELLIOTT,
GEO. W. KNECHT.